US005419114A

United States Patent [19]

Bauermeister et al.

[11] Patent Number: 5,419,114

[45] Date of Patent: May 30, 1995

[54] THERMOELASTIC CONNECTION OF THE INJECTOR TUBE AND THE FLAME TUBE OF A GAS TURBINE

[75] Inventors: Kurt Bauermeister, Mülheim; Emil Aschenbruck, Duisburg; Klaus D. Mohr, Wuppertal, all of Germany; Alain Moreau, Le Chesnay; Michel Guillaux, Montigny Les Cormeilles, both of France

[73] Assignee: MAN Gutehoffnungshütte AG, Oberhausen, Germany

[21] Appl. No.: 93,093

[22] Filed: Jul. 16, 1993

[30] Foreign Application Priority Data

Jul. 18, 1992 [DE] Germany ........................ 42 23 733.5

[51] Int. Cl.[6] ................................................ F02C 7/20

[52] U.S. Cl. ..................................... 60/39.32; 60/757; 285/41; 285/286

[58] Field of Search .................... 60/39.31, 39.32, 752, 60/753, 754, 755, 756, 757; 285/286, 187, 41 L, 41

[56] References Cited

U.S. PATENT DOCUMENTS

| | | | |
|---|---|---|---|
| 2,337,038 | 12/1943 | Fentress | 285/41 |
| 2,494,659 | 1/1950 | Huyton | 285/41 |
| 2,592,060 | 4/1952 | Oullanoff | 60/39.32 |
| 2,615,300 | 10/1952 | Lombard | 60/39.32 |
| 2,693,371 | 11/1954 | Nelson | 285/41 |
| 2,709,338 | 5/1955 | Morley et al. | 60/39.32 |
| 3,186,168 | 6/1965 | Ormerod et al. | 60/39.32 |
| 4,187,674 | 2/1980 | Richardson . | |
| 4,302,941 | 12/1981 | DuBell | 60/757 |
| 4,614,082 | 9/1986 | Sterman et al. | 60/39.32 |

FOREIGN PATENT DOCUMENTS

| | | |
|---|---|---|
| 2465080A1 | 9/1979 | France . |
| 825777 | 8/1949 | Germany . |
| 2632386 | 2/1977 | Germany . |

*Primary Examiner*—Dave W. Arola
*Attorney, Agent, or Firm*—McGlew and Tuttle

[57] ABSTRACT

The present invention pertains to a thermoelastic connection of a hot gas-carrying injector tube (8) to the flame tube (1) suspended in the combustion chamber housing (10) of a gas turbine. The injector tube (8) is connected by corrugated spacers (7) to a circumferential intermediate ring (6), which is attached to the lower flange of the flame tube (1) by detachable fastening elements (3, 4, 5). A circumferential cooling channel (annular space 15), into which cooling air is admitted, is formed between the cone of the injector tube (8) and the intermediate ring (6). The compressor air enters the combustion space (1, 8) of the combustion chamber (10) through the annular space (15) from below, as well as through the holes (11), especially through the circumferential gap (12).

10 Claims, 4 Drawing Sheets

THERMOELASTIC CONNECTION OF THE INJECTOR TUBE AND THE FLAME TUBE OF A GAS TURBINE

FIELD OF THE INVENTION

The present invention pertains to a thermoelastic connection of the hot gas-carrying injector tube to the flame tube suspended in the combustion chamber housing of a gas turbine.

BACKGROUND OF THE INVENTION

It was necessary, among other things, to connect the hot gas-carrying injector tube to the flame tube in connection with the development of a new gas turbine.

Prior-art designs of this type are based, among other things, on the principle of the sliding connection between the "cold" flame tube and the "hot" injector housing or injector tube.

The flame tube with the block support ring extends into the combustion chamber or injector housing, and a circumferential gap of varying size, through which cooling air flows, becomes free due to thermal expansion.

The injector housing has its own suspension in the combustion chamber housing in this case. Due to the large cross section of the circumferential gap and the necessary additional suspension of the injector housing, which should have been suitable for a 20° oblique position of the combustion chamber in the above-mentioned new development, it was not possible to apply this prior-art design principle here. The compressor air passing through the circumferential gap formed would have led to an impairment of cooling in other areas of the combustion chamber.

SUMMARY AND OBJECTS OF THE INVENTION

The primary object of the present invention is therefore to find a thermoelastic suspension for the injector tube, which is to meet the following criteria:

- connection of two components with different thermal expansions,
- minimum influence on the cooling air flow within the combustion chamber housing,
- avoiding additional support of the injector tube,
- further use of proven materials and common plate thicknesses, and achieving a sufficiently long life of the thermoelastic connection.

According to the invention, a thermoelastic connection is provided with regard to the hot gas-carrying injector tube and the flame tube, suspended in the combustion chamber housing of the gas turbine. Connection means are provided connected in a detachable manner to a lower end of the flame tube and is provided as a bracket for the injector tube arranged at a spaced location around the cone of the injector tube.

The thermoelastic connection between the flame tube and the injector tube is achieved by an intermediate ring as well as by means of corrugated spacers in the device according to the present invention.

The slotted intermediate ring, which represents the actual bracket of the injector tube, is located at a spaced location around the cone of the injector tube. A corrugated spacer ("wiggle strip"), which is spot-welded on both sides to the intermediate ring and the injector tube, is used as the connection element. The intermediate ring is bolted with at least four hexagon head screws with nuts to the lower end of the flame tube, the block support ring.

The flame tube with the injector tube bolted on is located in the combustion chamber housing. The two parts, namely, the flame tube and the injector tube, are fixed in tile combustion chamber housing by the suspension of the flame tube on the combustion chamber housing. The injector tube has no separate suspension to the combustion chamber housing.

The present invention is based on the following principle:

The intermediate ring compensates for the different thermal expansions of the block support ring (ca. 450° C.) and the hot injector tube (ca. 810° C.).

To maintain the stresses in the permissible range, the temperature of the intermediate ring is maintained low, the differences in expansion between tile block support ring and the injector tube are minimized, and precautionary measures are taken to eliminate the tangential stresses.

Reduction in temperature is achieved by the following measures:

- shielding the intermediate ring from the flame radiation by the injector tube,
- external and internal cooling of the intermediate ring with compressor air (350° C.), and
- cooling of the connection site between the intermediate ring and the injector tube.

To minimize the differences in expansion, the external cooling of the injector tube is further maintained in the area of the intermediate ring. This is achieved with corrugated spacers and slots in tile intermediate ring. At the same time, the slots in the intermediate ring eliminate the tangential stresses in the area of the connection of tile injector tube.

To cool the inner cone of the injector tube, compressor air (ca. 350° C.) is introduced through the corrugated spacer into the circumferential cooling channel between the injector tube and the intermediate ring, as a result of which this area is cooled by convection. This air is discharged from the intermediate space in tile upward direction, and is mixed with the air flowing through the tangential holes of the block support ring into tile interior of the flame tube.

To prevent circumferential stresses from developing at the thermoelastic connection site as a result of the different temperatures of the three components connected to each other by weld spots, namely, the intermediate ring, the spacer and tile injector tube, tile spacers are also slotted on their circumference. Each strap of the intermediate ring is connected by two weld spots to a spacer, and each spacer is connected by one weld spot to tile cone of the injector tube. It is also possible to reverse the procedure, so that each strap of the intermediate ring is connected by a weld spot to a spacer, and each spacer is connected by two weld spots to the cone of the injector tube.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
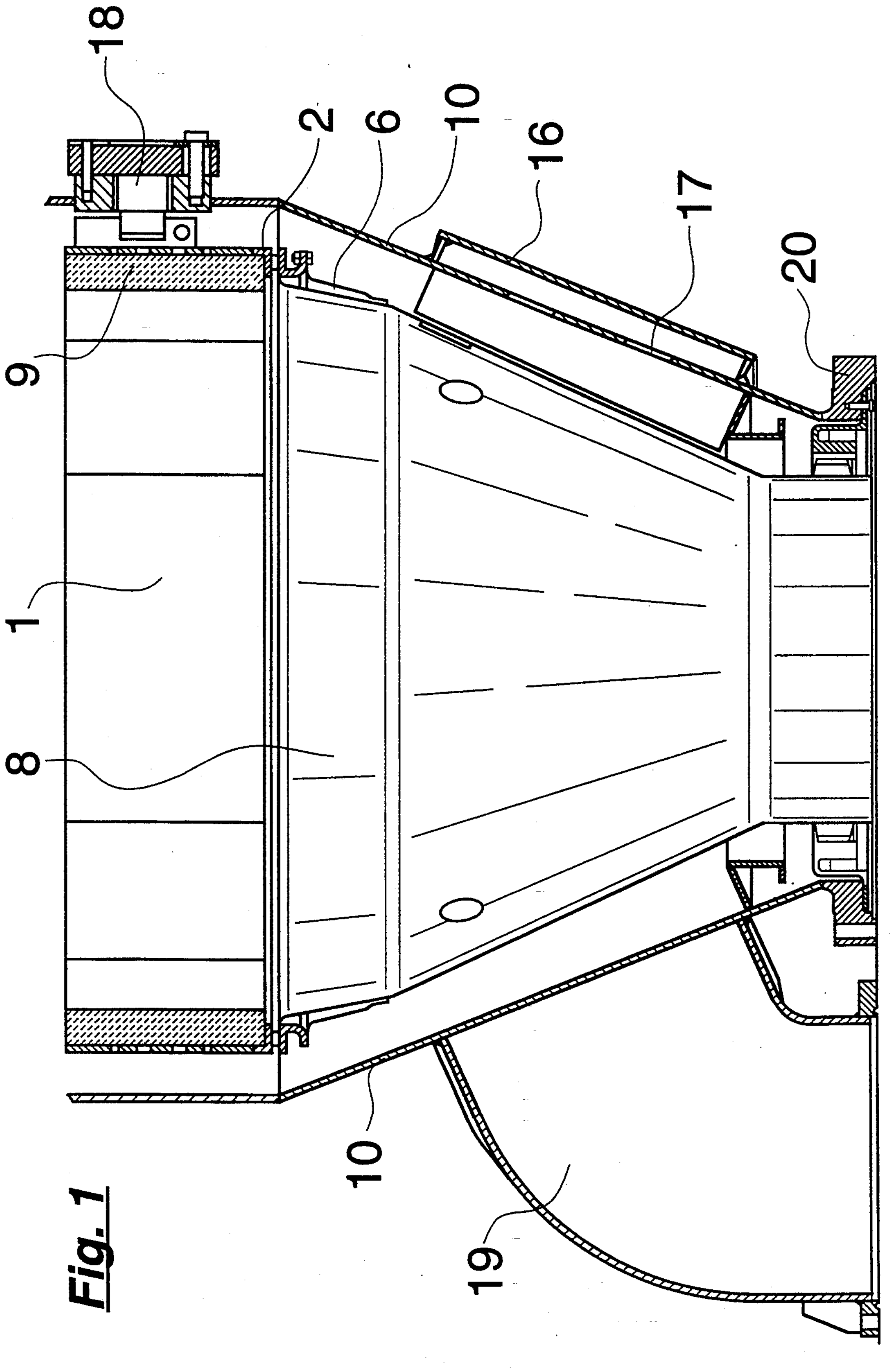
FIG. 1 is a cross sectional view taken through the combustion chamber housing according to the invention.

FIG. 1 shows a cross section of the combustion chamber housing 10, in which a flame tube 1 is fastened via suspension means (suspensions) 18 in the upper part. The flame tube 1 is lined with a ceramic refractory mass (ceramic lining) 9, which is held by a block support ring 2 in the lower part.

An injector tube 8 is attached to the flame tube 1 via an intermediate ring 6.

The compressor air is introduced into a circumferential annular channel 16 via an inlet elbow 19, and the compressor air enters the interior of the combustion chamber housing (which defines a combustion chamber) 10 via holes 17 and is then distributed into the flame tube 1 and the injector tube 8. The combustion chamber housing 10 includes a base 20.

Figure 2:
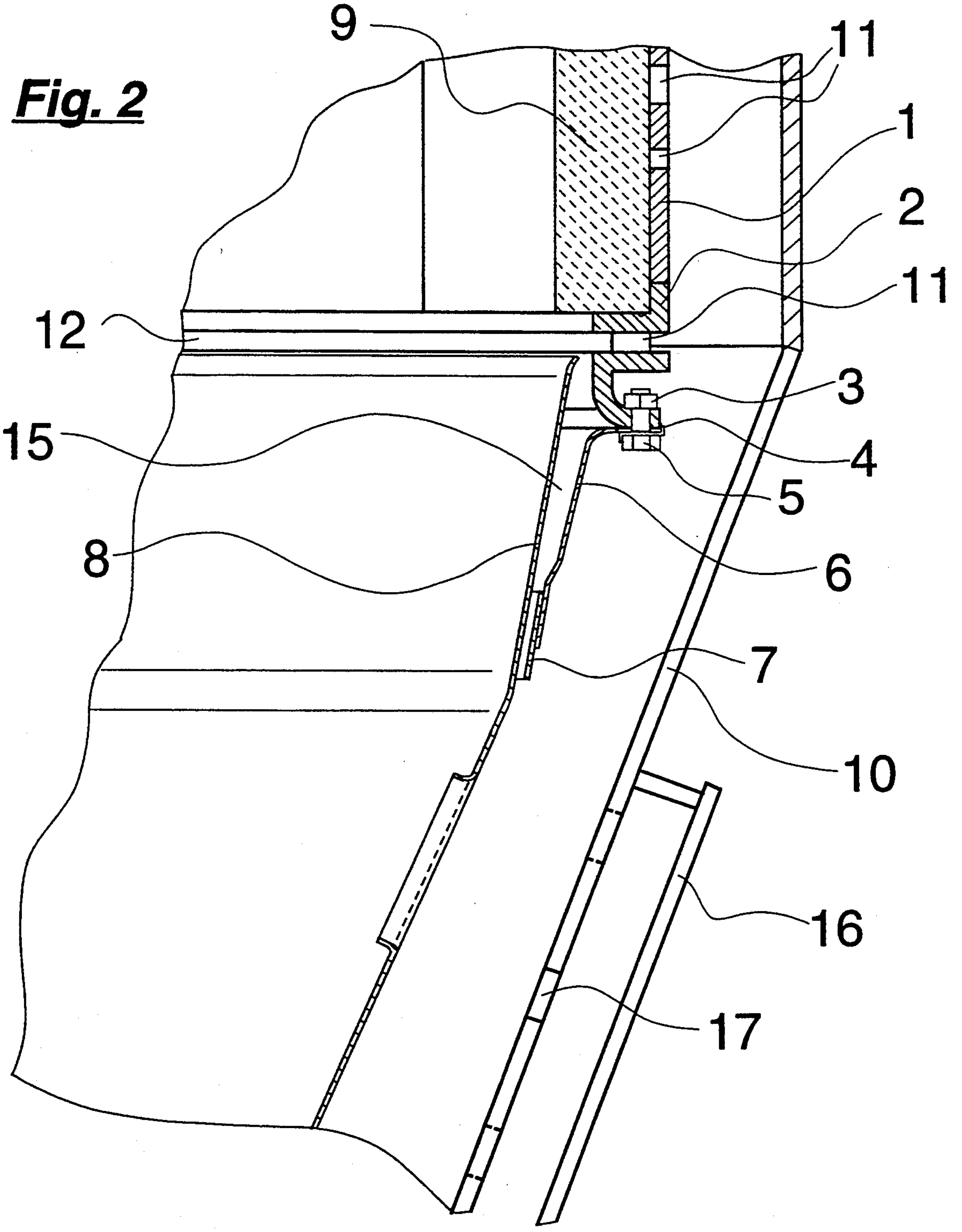
FIG. 2 is a cross sectional view taken in the area of the thermoelastic suspension according to the invention.

FIG. 2 shows the area of the thermoelastic suspension. The injector tube 8 is connected by means of corrugated spacers 7 to the intermediate ring 6, which in turn is attached to the flange of the flame tube 1 with fastening elements (screw connection 3, 4, 5, i.e. nut 3, safety plate 4 and bolt 5).

A circumferential cooling channel (annular space 15), into which cooling air is admitted from the below, is formed between the injector tube 8 and tile intermediate ring 6. The compressor air drawn in from the annular channel 16 passes through both tile annular space 15 provided as a cooling channel and the holes 11 and the circumferential gap 12 and into the inner combustion space 1, 8 of the combustion chamber 10.

Figure 3:
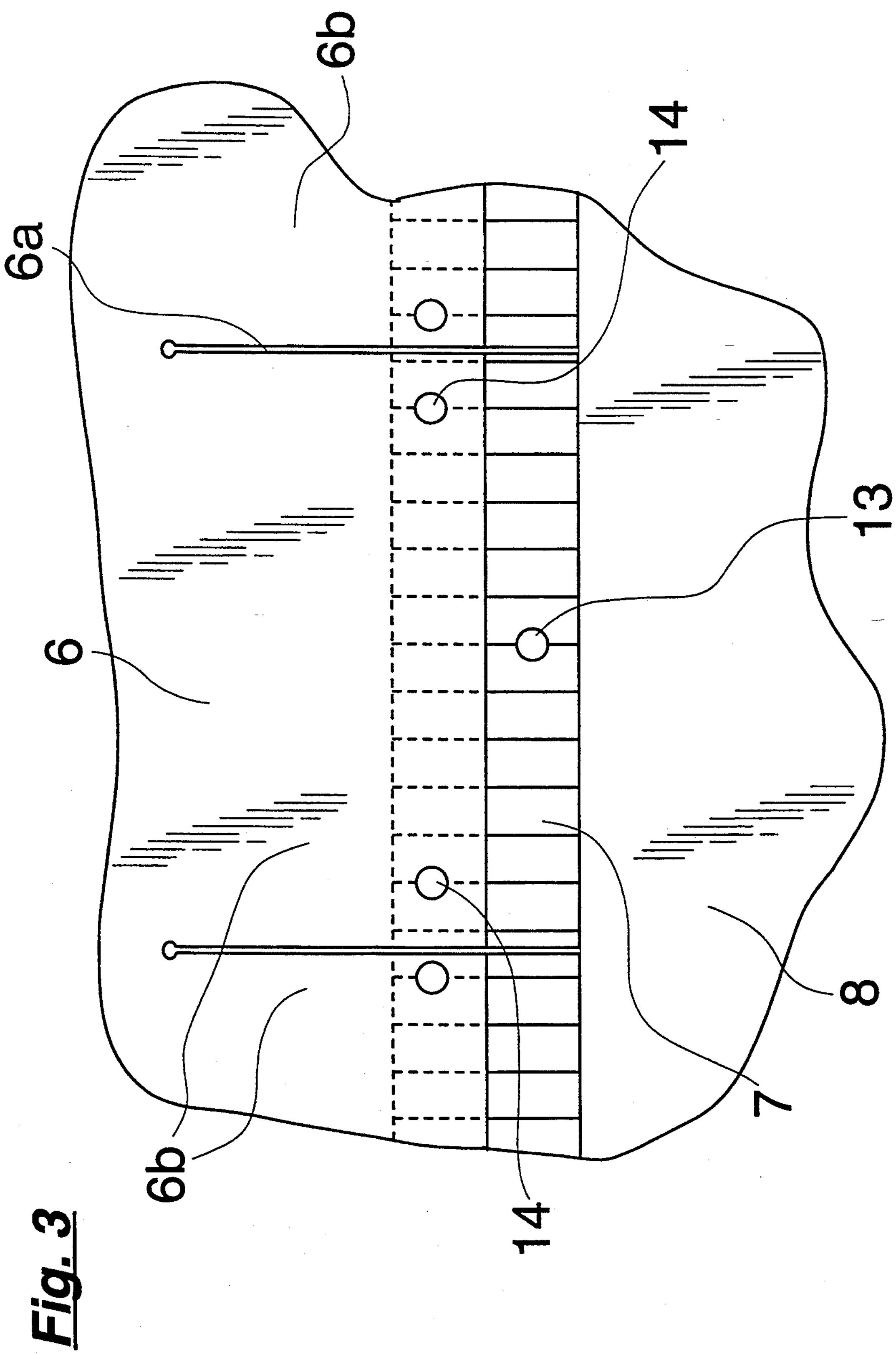
FIG. 3 is a top view of the arrangement of the thermoelastic connection.
Figure 4:
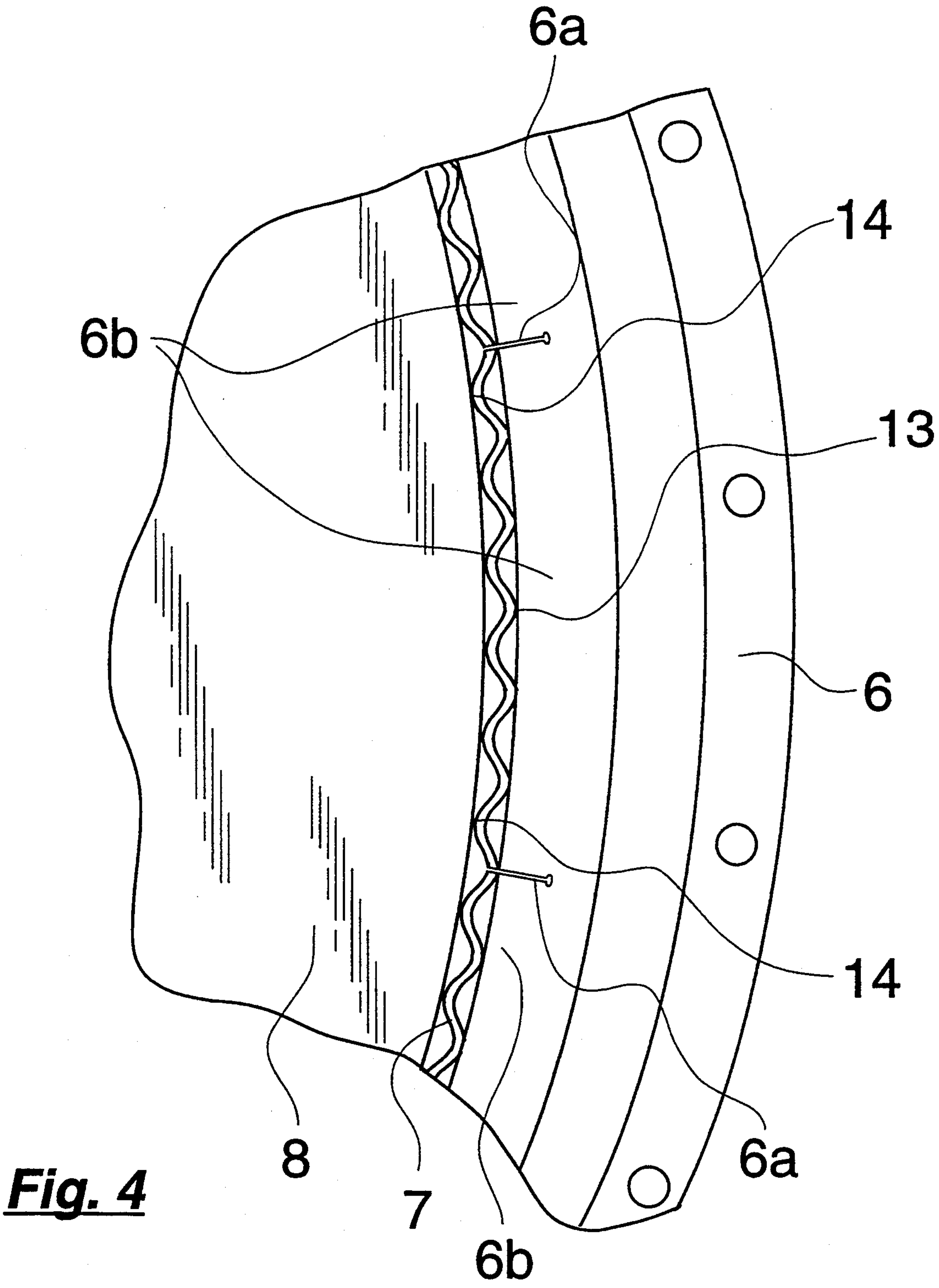
FIG. 4 is a cross sectional view of the arrangement of the thermoelastic connection.

Corresponding to FIGS. 3 and 4, the injector tube 8 is supported via a slotted intermediate ring 6, which is arranged at a spaced location around the cone of the injector tube 8. A corrugated spacer 7, which is spot-welded on both sides to tile straps *6b* of tile intermediate ring 6, is used as tile connection element.

The weld spot 13 is the connection to tile injector tube 8, and the weld spots 14 represent the connection to the intermediate ring 6, which is divided into individual straps *6b* in this area by longitudinal slots *6a* distributed uniformly on the circumference.

While a specific embodiment of the invention has been shown and described in detail to illustrate the application of the principles of the invention, it will be understood that the invention may be embodied otherwise without departing from such principles.

What is claimed is:

1. A thermoelastic connection for a gas turbine, comprising:

a hot gas-carrying injector tube;

a combustion chamber housing;

a flame tube positioned in said combustion chamber housing of the gas turbine;

suspension means for suspending said flame tube from said combustion chamber housing;

an intermediate ring arranged in a flange-like manner at one end of said flame tube, said intermediate ring being connected to said flame tube by detachable fastening elements, said intermediate ring being arranged at a spaced location around said injector tube forming a bracket for said injector tube;

corrugated spacers defining a connection element between said flame tube and said injector tube, said corrugated spacers being spot-welded to said injector tube and to said intermediate ring.

2. A thermoelastic connection according to claim 1, wherein:

said intermediate ring and said spacers are provided with vertical slots on their circumference, said vertical slots forming ribs on said intermediate ring whereby each rib is connected to said spacer via two weld spots and each spacer is connected to the injector tube via a weld spot.

3. A thermoelastic connection according to claim 2, wherein:

an annular space is defined between said intermediate ring and said injector tube, said corrugated spacers and said annular space defining a cooling channel for cooling said intermediate ring.

4. A thermoelastic connection according to claim 1, wherein:

said intermediate ring and said spacers are provided with vertical slots on their circumference, said vertical slots forming ribs on said intermediate ring whereby each rib is connected to said spacer via a weld spot and each spacer is connected to the injector tube via two weld spots.

5. A thermoelastic connection according to claim 4, wherein:

an annular space is defined between said intermediate ring and said injector tube, said corrugated spacers and said annular space defining a cooling channel for cooling said intermediate ring.

6. A thermoelastic connection according to claim 1, wherein:

an annular space is defined between said intermediate ring and said injector tube, said corrugated spacers and said annular space defining a cooling channel for cooling said intermediate ring.

7. A thermoelastic connection in accordance with claim 1, wherein:

said corrugated spacers are connected to said intermediate ring at an end of said intermediate ring substantially opposite said flame tube.

8. A thermoelastic connection for a gas turbine, comprising: a combustion chamber housing;

a flame tube positioned inside and connected to said combustion chamber housing, said flame tube having a flange end;

an intermediate ring having a first side connected to said flange end of said flame tube by detachable fastening elements, said intermediate ring having a second side positioned on a substantially opposite side of said intermediate ring from said first side;

a hot gas-carrying injector tube positioned inside said combustion chamber housing and having an end positioned inside said second end of said intermediate ring, said end of said injector tube being radially spaced from said second end of said intermediate ring;

a corrugated spacer defining a connection element between said second end of said intermediate ring and said end of said injector tube, said corrugated spacer being connected to said end of said injector tube by a spot-weld, said corrugated spacer being connected to said second end of said intermediate ring by a spot-weld.

9. A thermoelastic connection according to claim 8, wherein:

said intermediate ring and said corrugated spacer define slots oriented in an axial direction of said intermediate ring to form means for stopping circumferential stress between said end of said injector tube and said flange end of said flame tube.

10. A thermoelastic connection according to claim 8, wherein:

an annular space is defined between said intermediate ring and said end of said injector tube, said corrugated spacers and said annular space defining a cooling channel for guiding gas from between said injector tube and said combustion chamber housing to between said end of said injector tube and said intermediate ring for cooling said intermediate ring.

* * * * *